United States Patent

[11] 3,627,658

[72] Inventor James R. Ryffel
 Anderson, S.C.
[21] Appl. No. 1,876
[22] Filed Jan. 9, 1970
[45] Patented Dec. 14, 1971
[73] Assignee The Dow Chemical Company
 Midland, Mich.

[54] LEAD COMPOUNDS USED TO PROMOTE ATOMIC RADIATION INDUCED CROSS-LINKING IN CHLORINATED OLEFIN POLYMERS
4 Claims, No Drawings

[52] U.S. Cl. ................................................204/159.18,
 161/164, 161/254, 204/159.17, 204/159.2,
 260/94.9, 264/340
[51] Int. Cl. ...................................................... B01j 1/00,
 C08f 1/00
[50] Field of Search ................................................204/159.18,
 159.2

[56] References Cited
UNITED STATES PATENTS
3,098,808 7/1963 Anderson ..................... 204/159.2

*Primary Examiner*—Murray Tillman
*Assistant Examiner*—Richard B. Turer
*Attorneys*—Griswold & Burdick, Ronald G. Brookens and Albin R. Lindstrom

ABSTRACT: This invention pertains to cross-linking chlorinated olefin polymers and sheet materials with atomic radiation and to a means of promoting such cross-linking wherein from about one to 10 parts by weight of a lead compound selected from the group consisting of dibasic phosphites, dibasic phthalates, dibasic stearates, normal stearates, chlorostearates, ortho silicates, tribasic sulfates, tetrabasic fumarates and silicate-sulfates, is blended with the chlorinated olefin polymer prior to exposure thereof to atomic radiation.

LEAD COMPOUNDS USED TO PROMOTE ATOMIC RADIATION INDUCED CROSS-LINKING IN CHLORINATED OLEFIN POLYMERS

BACKGROUND OF THE INVENTION

Irradiation-induced cross-linking of polymeric materials, including the polyolefins and their halogenated derivatives, is known in the art. Methods of enhancing the cross-linking effect on polymeric materials with neutron radiation have been advanced but have imparted radioactivity to many materials so treated.

It is an object of this invention to provide a means of promoting the cross-linking of chlorinated olefin polymers or the corresponding polymeric sheet materials by atomic radiation, i.e., wherein necessary cross-linking is obtained with considerably lower radiation dosage and without adverse effect upon the material being cross-linked.

It is another object of to provide improved laminar structures of chlorinated polyolefin sheet materials which have been cross-linked to varying degrees using atomic radiation.

SUMMARY OF THE INVENTION

The objects of the present invention are accomplished by forming a mixture comprising a chlorinated olefin polymer which cross-links on exposure to atomic radiation, e.g. by the cross-linking action of beta particles, with from about 1 to 10 weight percent of a lead compound selected from the group consisting of dibasic phosphites, dibasic phthalates, dibasic stearates, normal stearates, chlorostearates, ortho silicates, tribasic sulfates, tetrabasic fumarates and silicate-sulfates, and exposing such mixture to the cross-linking action of atomic radiation

DESCRIPTION OF THE PREFERRED EMBODIMENTS

As starting materials for the preparation of the cross-linked products according to the present invention there may be used any chlorinated olefin polymer which may be cross-linked by atomic radiation. Chlorinated olefin polymers which are particularly useful for preparing cross-linked sheeting for use in a variety of construction material applications are the solid, chlorinated olefin polymers prepared by the chlorination of polyethylene, or interpolymers containing at least about 90 mole percent of ethylene in the polymer molecule with any remainder being one or more ethylenically unsaturated comonomers, wherein such polymers are preferably of an essentially linear structure and have a molecular weight of less than about 1,000,000 and preferably a molecular weight of from about 20,000 to 300,000. Such chlorinated olefin polymers most advantageously contain from about 25 to 50 weight percent of chemically combined chlorine and are further characterized by having a relative crystallinity of less than about 10 percent, and are capable of being formed into sheet materials having, in its noncross-linked form, a 100 percent modulus of less than about 500 p.s.i.

The preferred chlorinated polyolefins may be prepared by the process disclosed in U.S. Pat. No. 3,454,544, issued July 8, 1969.

Although the present invention contemplates any source and type of atomic radiation which is capable of cross-linking the herein described chlorinated olefin polymers without permanent adverse affect therein, e.g. imparting of radioactivity, particularly good results are obtained when using beta particles as the source of cross-linking radiation.

In this regard, it has been found to be possible to obtain a chlorinated polyolefin sheet of the type described herein as being preferred for construction material applications, e.g. for use as flashing material, which is significantly cross-linked yet solvent weldable by subjecting such sheet, having a thickness of from about 5 to 300 mils, to the action of beta energy within the range of from about 0.5 to 3 MEV. More particularly, by way of illustration, highly desirable results are obtained by irradiating such chlorinated polyolefin sheet, having a thickness of about 0.060 of an inch with 2 MEV electrons from a Van deGraaf accelerator at approximately 150 microampers' beam current and 0.25 does per pass. The above discovery comprehends the fact that when the proper balance of radiation energy and sheet thickness is achieved, the absorption of beta particles and the resulting cross-linking of the chlorinated polyolefin increase from a minimum at the exposed surface, reach a maximum at some point in the interior of the sheet and decrease thereafter. Therefore, a chlorinated polyolefin sheet is produced having tensile properties which are significantly improved due to the cross-linking within such sheet and wherein one or both surfaces of such sheet are solvent weldable depending upon the radiation energy and the thickness of the sheet used. Further, since the distance from the exposed surface of the sheet to the region of maximum absorption and cross-linking within varies directly with the energy of the impinging beta radiation, a proper match of radiation energy and sheet thickness must be made to obtain the desired results. MOreover, if both major surfaces of the sheet are irradiated, the degree of absorption and resulting cross-linking within the sheet are increased linearly without any significant decrease in the solvent weldability of the surfaces.

It is possible to obtain, by the methods described above, highly desirable laminar structures of the chlorinated polyolefins described herein having inner layers which are cross-linked to a greater extent than the outer layers wherein such structures possess excellent tensile strength due to a relatively highly cross-linked inner core and having outer layers which remain solvent weldable. Still further, laminar structures may also be obtained, through proper adjustment of sheet thickness and composition and irradiation energy levels, wherein the outer layers are highly cross-linked and the inner layer or core is cross-linked to a lesser degree, which structures possess surfaces which are resistant to the action of solvents while retaining the overall softness characteristic of non-cross-linked material.

The cross-linking promoting agents or attenuators contemplated by the present invention are lead compounds selected from the group consisting of dibasic phosphites, dibasic phthalates, dibasic stearates, normal stearates, chlorostearates, ortho silicates, tribasic sulfates, tetrabasic fumarates and silicate-sulfonates. The use of such compounds in the required amounts, unexpectedly, have been found to considerably lower the radiation dosage that is otherwise necessary to obtain the necessary cross-linking effect. Such promoters may be incorporated into the chlorinated olefin polymer, by any conventional technique, prior to exposure of such polymer to atomic radiation. Generally, such materials are used in amounts of from 1 to 10 parts by weight of polymer.

The chlorinated olefin polymers may also contain usual amounts and types of other additives, e.g. conventionally used fillers, plasticizers and stabilizers and the like as well as various difunctional monomers such as trimethylol propane trimethacrylate, ethylene dimethacrylate and divinylbenzene and the like.

Sheet materials may be prepared from the noncross-linked chlorinated olefin polymer compositions described herein substantially in the manner as conventionally employed in preparing sheeting from chlorinated olefin polymers. For example, the necessary ingredients may be initially dry-blended in a mixer such as a ribbon blender and subsequently milled on a two-roll compounding mill at roll temperatures between about 240° F. and 400° F. until the mixture becomes homogeneous. The blend may then be extruded into sheet form or calendered to give the desired sheet thickness. In general, sheetlike structures having a thickness of between about 0.005 and 0.25 of an inch and preferably between about 0.010 and 0.1 of an inch are utilized for construction purposes.

The following specific example, wherein all parts and percentages are to be taken by weight, illustrates the present invention but is not to be construed as limiting its scope.

EXAMPLE

To 4,000 grams of deionized water was added, with stirring, 200 grams of a polyethylene having an essentially linear and unbranched structure (containing less than about 1 methyl group per 100 methylene units), and having a melt index of about 1 and a molecular weight of about 67,000. Such polyethylene had been previously prepared by a process using a catalyst composed of triisobutyl aluminum and titanium tetrachloride. The resulting admixture was then charged to a 1½ gallon autoclave with 8 grams of calcium chloride; and 0.5 cc. of a 70 percent solution of ditertiary butyl peroxide in butanol; and about 10 drops of a commercially available wetting agent.

The charge was then chlorinated, in a first chlorination step, under about 30 p.s.i. (gauge) of chlorine pressure at a temperature of about 90° C. until a chlorine content of about 20 percent was obtained. The charge was then chlorinated in a second suspension chlorination step, at a temperature of about 126° C. until a total chlorine content of about 42 percent was obtained. The chlorination product was then isolated from the dispersion by filtration, washed free of residual hydrochloric acid and dried.

The dried material was then used to prepare the following formulations by dry-blending of the designated materials in a Banbury mixer.

Series I, formulation:
100 parts chlorinated polyethylene
10.5 parts carbon black
10 parts talc
1 part Oncor 23A
2 parts Chlorowax 70
plus additives below.

} inert additives and fillers

TABLE I

| Component | Run No. | | | | | | |
|---|---|---|---|---|---|---|---|
| | 1 | 2 | 3 | 4 | 5 | 6 | 7 |
| | Parts by weight | | | | | | |
| (1) Ferro 1827 | 2 | | | | | | |
| (2) Mark LL | | 4 | | | | | |
| (3) Drapex 4.4 | 3 | 3 | | | | | |
| (4) CH-55 | ½ | ½ | | | | | |
| (5) Stearic acid | 1 | 2 | | | | | |
| (6) T-24 | | | 1 | 1.25 | | 1 | |
| (7) T-20 | | | | 1.25 | | | |
| (8) Ca stearate | | | | .75 | | | |
| (9) Dythal XL | | | | | 2 | | |
| (10) PTMA | | | | | | 4 | |
| (11) T-31 | | | | | | 2 | 1 |

(1) Solid barium-cadmium soap.
(2) Liquid barium-cadmium soap.
(3) Epoxy plasticizer.
(4) Organic phosphite.
(5) Lubricant.
(6) Organo-tin mercaptide.
(7) Organo-tin mercaptide.
(8) Lubricant.
(9) Dibasic lead phthalate.
(10) Trimethylol propane trimethacrylate.
(11) Tin mercaptide.

Each individual dry blend was then separately conveyed into the feed hopper of a two-stage vacuum vented single screw extruder. The first stage was operated at 375°–400° F. and the second state at 325°–400° F. The vacuum was about 26 inches of mercury. The melt was then passed through a sheet die to form sheet having a thickness of about 0.060 inches. The individual sheet samples were then separately irradiated over one major surface thereof with various dosages of 2 MEV beta particles from a Van deGraaf accelerator at approximately 150 microamperes beam current and 0.25 dose per pass. The physical properties and percent gels were then determined for each individual sample according to ASTM D–412–62T, with regard to 100 percent modulus, ultimate tensile and percent elongation. The extent of cross-linking in each sample was determined by the following technique:

A wire cage (100 mesh) (1 inch × 2 inch) was made for each sample. Approximately 0.2 gram of sample was cut from the original sheet which had been irradiated. After weighting the cage with ample enclosed, it was suspended in 250 ml. of toluene and refluxed for 16 hours. The cage was then removed and placed in a vacuum oven at 70° C. for 24 hours. Results are reported as percent of the sample which was extractable or not extractable (gels):

A plot of the percent extractables versus total irradiation received was made for a group of CPE samples all of which

TABLE II

| Run Number | 1 | 2 | 3 | 4 | 5 | 6 | 7 |
|---|---|---|---|---|---|---|---|
| 2 megards: | | | | | | | |
| 100% modulus | 79 | 72 | 85 | 102 | 82 | 106 | 90 |
| Ult. tensile | 99 | 56 | 75 | 111 | 74 | 232 | 225 |
| Percent Elongation | >1,240 | >1,240 | >1,240 | >1,240 | >1,240 | >1,150 | 1,200 |
| Percent gel | 31 | 29 | 40 | 41 | 23 | 63 | 57 |
| 5 megards: | | | | | | | |
| 100% modulus | 91 | 82 | 98 | 129 | 94 | 135 | 110 |
| Ult. tensile | 202 | <75 | >185 | 302 | 230 | 382 | 325 |
| Percent elogation | 1,220 | >1,240 | >1,240 | 1,080 | 1,220 | 840 | 950 | had the same additives, etc. An exponential function resulting in the region from 0–10 megarads of irradiation.

Reproducibility was found to be 1.0 percent for those samples with less than 40 percent extractables. The samples with more than 40 percent extractables had a reproducibility of approximately ±2.5 percent.

The following table II illustrates the physical properties and extent of cross-linking as a function of percent gel for each sheet sample.

The above data illustrate the unexpected enhanced degree of cross-linking obtained by using dibasic lead phthalate as the additive (Run. No. 6) with accompanying increased tensile strength, while retaining desirable 100 percent modulus and elongation characteristics, as compared to the use of other metallic compounds commonly employed in the specified formulation.

Series II

Formulation:
100 parts chlorinated polyethylene
10.5 parts of a mixture of polyethylene and carbon black
10 parts talc
3 parts inert fillers
plus additives below

| Run Number | 8 | 9 | 10 | 11 | 12 | 13 | 14 | 15 | 16 | 17 | 18 | 19 |
|---|---|---|---|---|---|---|---|---|---|---|---|---|
| Mark LL (1) | 4 | 4 | | | | | | | | | | |
| CH-55 (2) | ½ | ½ | | | | | | | | | | |
| Drapes 4.4-(3) | 3 | | | | | | | | | | | |
| Stearic acid (4) | 2 | 2 | | | | | | | | | | |
| Dythal XL (5) | | | 1 | 1 | 1 | 1 | 1 | 1 | 1 | 1 | 1 | 1 |
| Dyphos XL (6) | | | 3 | 5 | 7 | 3 | 4 | | | | | |
| DS-207 (7) | | | | | | | 4 | | | | | |
| Lectro 60 XL (8) | | | 1 | 1 | 1 | 3 | | | | | | |
| Plub-O-Sil C (9) | | | | | | | | 4 | | | | |
| Tribase XL (10) | | | | | | | | | | 4 | | |
| Lectro 78 | | | | | | | | | | | 4 | 4 |
| Percent extract:[1] | | | | | | | | | | | | |
| 2 megards | 69.7 | 72.0 | 72.0 | 38.6 | 40.8 | 47.3 | 44.6 | 43.7 | 50.7 | 49.8 | 44.2 | 38.2 |
| 5 megards | 51.5 | 54.6 | 22.5 | 24.0 | 20.7 | 20.8 | 22.3 | 23.8 | 23.8 | 23.8 | 22.0 | 23.2 |

[1] To convert to percent gel, substract from 100.

(1) Liquid barium-cadmium soap
(2) Organo phosphite
(3) Epoxy plasticizer
(4) Lubricant
(5) Dibasic lead phthalate
(6) Dibasic lead phosphite
(7) Dibasic lead stearate
(8) Lead chlorosilicate complex
(9) Coprecipitated lead orthosilicate and silica gel
(10) Monohydrous tribasic lead sulfate
(11) Tetrabasic fumarate The above data also illustrate the unexpectedly enhanced amount of cross-linking obtained by using the lead compounds according to the present invention. Other useful lead compounds include the normal lead stearates and the lead silicate-sulfates.

What is claimed is:

1. A method of cross-linking a chlorinated olefin polymer selected from the group consisting of chlorinated polyethylene and chlorinated interpolymers of ethylene with other ethylenically unsaturated comonomers containing at least about 90 mole percent of ethylene which cross-links on exposure to atomic radiation comprising forming a mixture of said chlorinated polymer with from about 1 to 10 parts by weight per 100 parts of said polymer of a lead compound selected from the group consisting of dibasic phosphites, dibasic phthalates, dibasic stearates, normal stearates, chlorostearates, ortho silicates, tribasic sulfates, tetrabasic fumarates and silicate-sulfates; and exposing said mixture to the cross-linking action of atomic radiation.

2. The method of claim 1 wherein said mixture is formed into a sheet prior to exposure to atomic radiation.

3. The method of claim 2 wherein aid polymer is chlorinated polyethylene.

4. The method of claim 3 wherein said atomic radiation consists essentially of the cross-linking action of beta particles.

* * * * *